(12) United States Patent
Chang (10) Patent No.: US 7,350,768 B1
(45) Date of Patent: Apr. 1, 2008

(54) CARGO BRACING DEVICE

(76) Inventor: Vincent Chang, No. 15-10, Lane 142, Sec. 5, Changnan Road, Changhua 50088 (TW)

( * ) Notice: Subject to any disclaimer, the term of this patent is extended or adjusted under 35 U.S.C. 154(b) by 0 days.

(21) Appl. No.: 11/725,666

(22) Filed: Mar. 20, 2007

(51) Int. Cl.
*B25B 25/00* (2006.01)

(52) U.S. Cl. .................. 254/218; 254/223; 254/238; 24/70 ST; 24/71 ST (58) Field of Classification Search ............. 254/217, 254/218, 223, 238, 247; 24/70 ST, 69 ST, 24/69 CT, 69 T, 71 ST
See application file for complete search history.

(56) References Cited

U.S. PATENT DOCUMENTS

| | | | |
|---|---|---|---|
| 4,199,182 A | 4/1980 | Sunesson | 254/79 |
| 4,268,012 A * | 5/1981 | Ruehle et al. | 254/223 |
| 4,510,651 A * | 4/1985 | Prete et al. | 24/68 R |
| 4,781,499 A | 11/1988 | Wisecarver | 410/151 |
| 5,369,848 A | 12/1994 | Huang | 24/68 CD |
| 5,443,342 A | 8/1995 | Huang | 410/151 |
| 5,494,387 A * | 2/1996 | Ruegg | 410/103 |
| 5,769,580 A | 6/1998 | Purvis | 410/151 |
| 5,947,666 A | 9/1999 | Huang | 410/151 |
| 6,007,053 A | 12/1999 | Huang | 254/247 |
| 6,799,751 B1 * | 10/2004 | Anderson | 254/223 |
| 6,908,073 B1 * | 6/2005 | Hsien | 254/218 |

* cited by examiner

*Primary Examiner*—Emmanuel M Marcelo
(74) *Attorney, Agent, or Firm*—Charles E. Baxley (57) ABSTRACT

A cargo bracing device includes a base having two side plates for rotatably attaching a reel drum, one or more toothed discs attached to the reel drum and controlled to rotate relative to the base with a stop, an operating arm having two legs rotatably attached to the reel drum, a catch device attached to the operating arm and engaged with the toothed disc, and an anchoring device may detachably anchor the legs of the operating arm to the reel drum, and the legs of the operating arm may be selectively disengaged from the reel drum to prevent the operating arm from being operated by unauthorized persons, and for preventing the cargo from being stolen by the unauthorized persons.

13 Claims, 10 Drawing Sheets

CARGO BRACING DEVICE

BACKGROUND OF THE INVENTION

1. Field of the Invention

The present invention relates to a strapping device or a cargo bracing or tie-down or fastening device, and more particularly to a cargo bracing device including an actuating handle selectively detached or disassembled or disengaged from the cargo bracing device for preventing the cargo bracing device from being operated or actuated by unauthorized persons.

2. Description of the Prior Art

Typical cargo bracing or tie-down or fastening device or strapping devices comprise two arms pivotally mounted about a reel drum on which are mounted toothed discs which turn with the drum, the first arm includes a first catch engaged with the teeth of the disc teeth for preventing the belt and the reel drum from being rotated reversely and for allowing the belt to be wound onto the reel drum, and the second arm includes a second catch engaged with the teeth of the disc teeth for preventing the belt and the reel drum from being rotated reversely when the belt and the reel drum are pivoting relative to the arms.

For example, U.S. Pat. No. 4,199,182 to Sunesson, and U.S. Pat. No. 5,369,848 to Huang, and U.S. Pat. No. 6,007,053 to Huang disclose three of the typical devices for tightening and locking load-fastening belts each also comprising two arms pivotally mounted about a reel drum for winding or tightening the belt with the reel drum by pivoting or rotating the arms relative to each other.

However, after the belt is wound or tightened onto the reel drum by the arms, one of the arms or the pivoting arm may not be removed or detached or disassembled or disengaged from the strapping device such that the belt may also be easily unwound or released from the reel drum with the arms by the unauthorized persons. For example, it will be dangerous and the cargo may fall down when the arms are operated or actuated by such as the children inadvertently.

U.S. Pat. No. 4,781,499 to Wisecarver, U.S. Pat. No. 5,443,342 to Huang, U.S. Pat. No. 5,769,580 to Purvis, and U.S. Pat. No. 5,947,666 to Huang disclose four of the typical cargo bracing or tie-down or fastening devices or strapping devices each comprising an inner pipe having a toothed rack disposed or provided thereon, an outer pipe slidably engaged onto the inner pipe and movable or adjustable relative to the inner pipe, and a straight movable arm having a gear engaged with the toothed rack for moving the inner pipe relative to the outer pipe and thus for positioning the cargo bracing devices onto the vehicles, between two walls, or the other objects.

However, similarly, after the inner pipe is moved relative to the outer pipe and tightened or positioned onto the vehicles, between two walls, or the other objects, the straight movable arm also may not be removed or detached or disassembled or disengaged from the typical cargo bracing devices such that the typical cargo bracing devices may also be easily unfastened or released from the vehicles or walls or objects with the straight movable arm by the unauthorized persons.

The present invention has arisen to mitigate and/or obviate the afore-described disadvantages of the conventional cargo bracing or tie-down or fastening devices or strapping devices.

SUMMARY OF THE INVENTION

The primary objective of the present invention is to provide a cargo bracing device including an actuating handle selectively detached or disassembled or disengaged from the cargo bracing device for preventing the cargo bracing device from being operated or actuated by unauthorized persons.

In accordance with one aspect of the invention, there is provided a cargo bracing device comprising a base including two side plates, the side plates each including an orifice formed therein, a reel drum rotatably engaged in the orifices of the side plates of the base for rotatably attaching the reel drum to the base, at least one toothed disc attached to the reel drum and rotated in concert with the reel drum, and including a plurality of disc teeth provided thereon, a spring-biased stop slidably attached to the base and engaged with the disc teeth of the toothed disc, for limiting the toothed disc and the reel drum to rotate relative to the base in an active direction and for preventing the reel drum from being rotated in a reverse direction relative to the base, an operating arm including two legs rotatably attached to the reel drum, a spring-biased catch device slidably attached to the operating arm and engaged with the disc teeth of the toothed disc, for allowing the toothed disc and the reel drum to be rotated relative to the base by the operating arm in the active direction and for preventing the reel drum from being rotated in the reverse direction relative to the base by the operating arm, and a detachably anchoring device for detachably anchoring the legs of the operating arm to the reel drum, and the legs of the operating arm being selectively disengageable from the reel drum and the base when required, to prevent the operating arm of the cargo bracing device from being operated or actuated by unauthorized persons, and for preventing the cargo from being stolen by the unauthorized persons.

The detachably anchoring device includes at least one anchor member for detachably anchoring the legs of the operating arm to the reel drum. The anchor member is attached to the catch device with one or more fasteners for selectively engaging with the reel drum.

The operating arm includes an opening formed in each of the legs for receiving the reel drum and for attaching or mounting the legs of the operating arm to the reel drum, and the opening of at least one of the legs includes an open portion, and the anchor member is selectively engageable into the open portion of the opening of the legs.

The reel drum includes two drum halves spaced away from each other for forming a strap receiving slot between the drum halves. The toothed disc include two apertures formed therein for receiving the drum halves of the reel drum respectively and for allowing the toothed disc to be pivoted or rotated in concert with the reel drum.

The base includes a channel formed in each of the side plates for slidably attaching the stop. The base includes a peg formed in at least one of the side plates, and a spring member includes a ring engaged with the peg of the side plate, and a first end engaged with the side plate of the base and a second end for engaging with the stop and for biasing the stop to engage with the disc teeth of the toothed disc.

The stop includes a perforation formed therein for receiving the second end of the spring member. The base includes a notch formed in at least one of the side plates and communicating with the channel of the side plate and located beside the peg for forming or defining the peg and for stably receiving the ring of the spring member.

The operating arm includes a groove formed in each of the legs for slidably attaching the catch device. The operating arm includes a projection formed in at least one of the legs, and a spring member includes a ring engaged with the projection of the leg, and a first end engaged with the leg of the operating arm and a second end for engaging with the catch device and for biasing the catch device to engage with the disc teeth of the toothed disc.

The catch device includes a perforation formed therein for receiving the second end of the spring member. The operating arm includes a notch formed in at least one of the legs and communicating with the groove of the leg and located beside the projection for forming the projection and for receiving the ring of the spring member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-6, a cargo bracing device 1 in accordance with the present invention comprises two arms or a base 10 and an operating arm 30 to be pivotally coupled together or pivotally mounted about a reel drum 20, for example, the base 10 includes two side walls or plates 11 extended or dependent downwardly from a lateral or upper or base wall or plate 12, the side plates 11 each include an orifice 13 formed therein for rotatably receiving the reel drum 20, the reel drum 20 includes two drum halves 21 spaced away from each other for forming or defining a strap receiving slot 22 between the two drum halves 21, and one or more (such as two) toothed discs 23 attached or mounted or secured to the reel drum 20.

Figure 3:
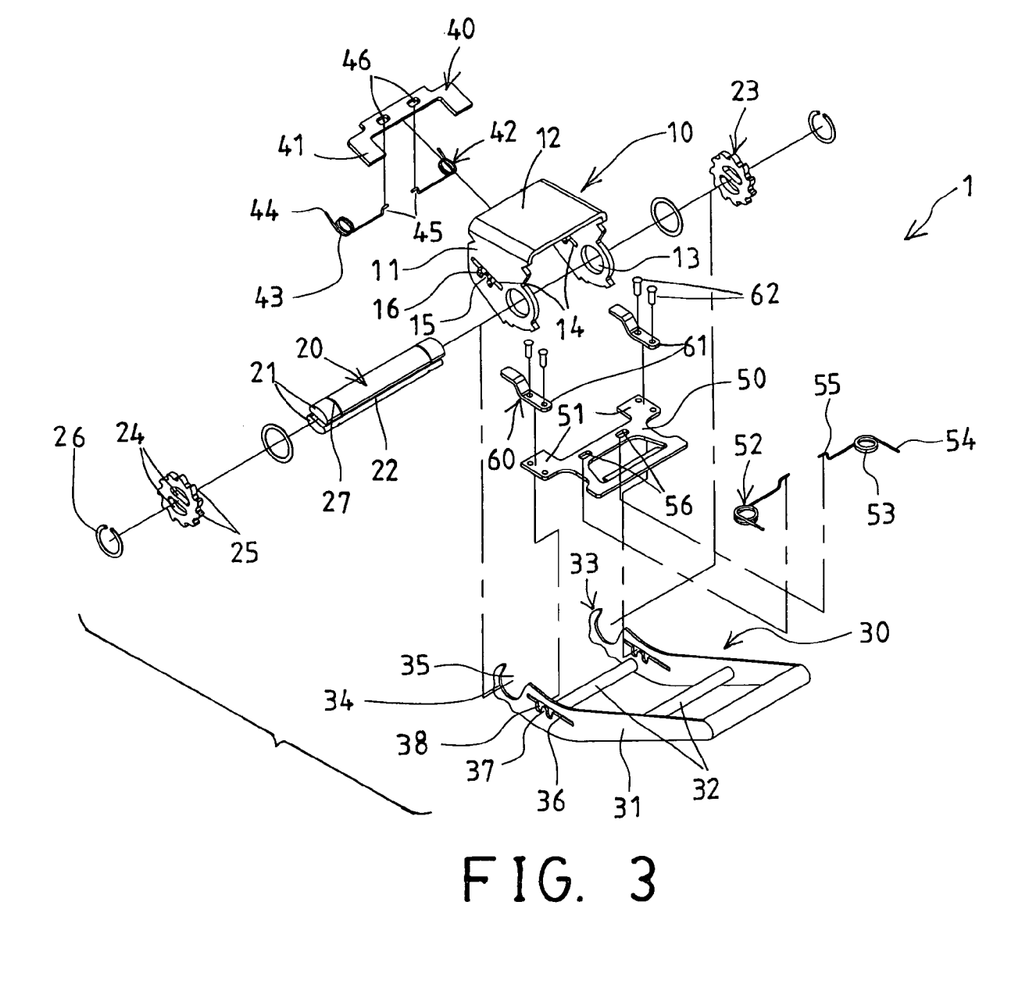
FIG. 3 is an exploded view of the cargo bracing device.
Figure 4:
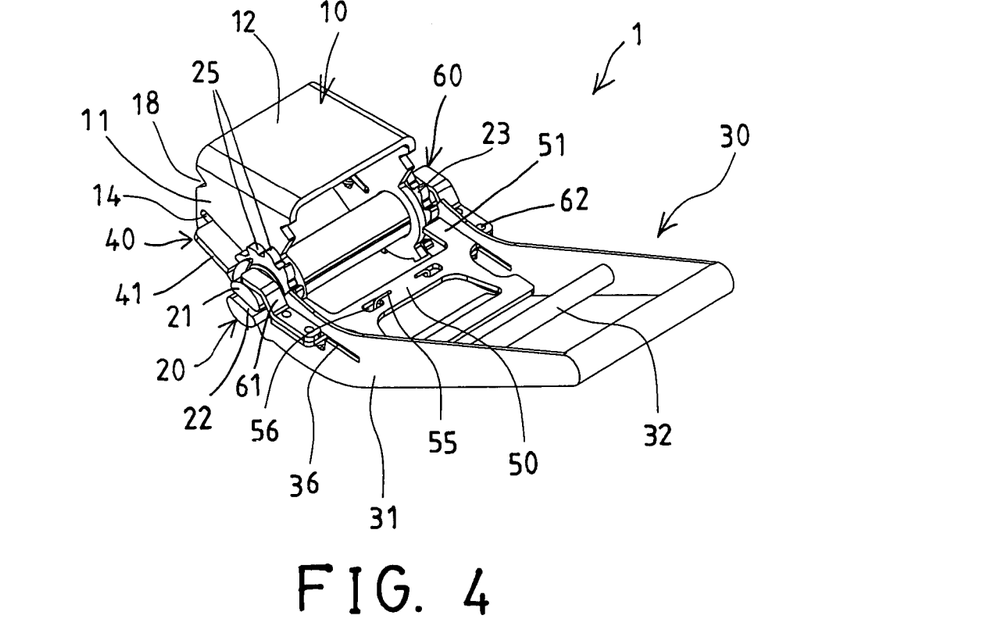
FIG. 4 is a perspective view of the cargo bracing device.
Figure 5:
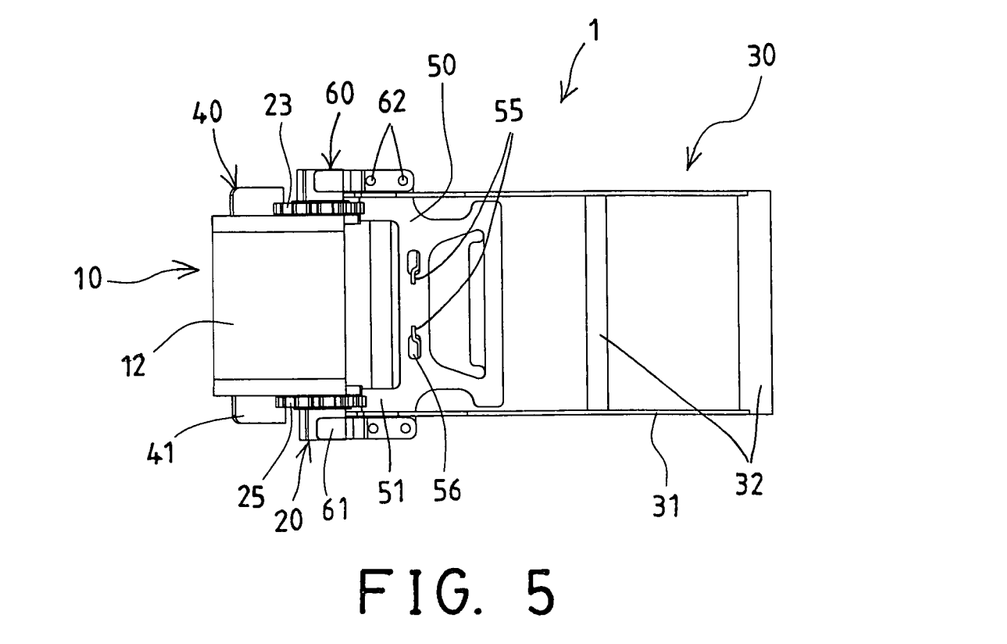
FIG. 5 is a top plan schematic view of the cargo bracing device.

For example, the toothed discs 23 each include two apertures 24 formed therein for receiving the end portions of the drum halves 21 of the reel drum 20 respectively and for allowing the toothed discs 23 to be turned or rotated in concert with the reel drum 20. The toothed discs 23 each further include a number of disc teeth 25 provided or formed thereon, and one or more (such as two) clamping or retaining rings 26 are attached or engaged with the reel drum 20, such as engaged with the peripheral depressions 27 the reel drum 20 for engaging with the side plates 11 and for anchoring or positioning the reel drum 20 to the base 10 and for preventing the reel drum 20 from being moved laterally relative to the base 10 and for preventing the reel drum 20 from being disengaged from the base 10.

The base 10 includes a channel 14 formed in each of the side plates 11 for slidably attaching or receiving a spring-biased stop 40 which includes one or more (such as two) limbs 41 for engaging with the disc teeth 25 of the toothed discs 23 and for guiding or limiting the toothed discs 23 and the reel drum 20 to rotate relative to the base 10 in one or an active direction only and for preventing the reel drum 20 from being rotated in a reverse direction relative to the base 10 and thus for allowing the reel drum 20 to rotate only in the active direction relative to the base 10. The base 10 includes a peg 15 formed in each of the side plates 11 and/or includes one or more (such as two) notches 16 formed in each of the side plates 11 and communicating with the channel 14 of the side plates 11 and located beside the peg 15 for forming or defining the pegs 15 of the side plates 11.

One or more (such as two) spring members 42 each include a coil or ring 43 engaged into the notches 16 of the side plates 11 and engaged with the pegs 15 of the side plates 11, and one end 44 (FIG. 3) for engaging with the side plates 11 of the base 10 and the other end 45 for engaging with the perforations 46 of the stop 40 and thus for biasing or forcing the limbs 41 of the stop 40 to engage with the disc teeth 25 of the toothed discs 23 and for guiding or limiting the toothed discs 23 and the reel drum 20 to rotate relative to the base 10, and thus for allowing the toothed discs 23 and the reel drum 20 to rotate in the active direction relative to the base 10 step by step. The base 10 may include a number of notches or cavities 18 formed therein for anchoring or positioning or securing the base 10 to various supporting objects 80 (FIG. 1), 88 (FIG. 2), such as the vehicles or trunks.

The operating arm 30 includes two legs 31 disposed or arranged parallel to each other, and one or more rods 32 straddled or secured between the legs 31 for reinforcing the legs 31 and for forming a stable or solid structure for the operating arm 30. The legs 31 each include a free end or a mounting portion 33 having an opening 34 formed therein and an open portion 35 formed in the outer portion of the opening 34 of the legs 31 in order to form the opened opening 34 for the legs 31, or the opening 34 of the legs 31 includes an open portion 35, and thus for allowing the end portions of the reel drum 20 to be engaged into the opened opening 34 of the legs 31 respectively, and/or for allowing the legs 31 of the operating arm 30 to be rotatably attached or mounted or secured or engaged onto the reel drum 20.

The operating arm 30 further includes a groove 36 formed in each of the legs 31 for slidably receiving a spring-biased catch device 50 which includes one or more (such as two) pawls 51 for engaging with the disc teeth 25 of the toothed discs 23 and for allowing the toothed discs 23 and the reel drum 20 to be forced to rotate relative to the base 10 in the active direction by the operating arm 30. The operating arm 30 further includes a projection 37 formed in each of the legs 31 and/or includes one or more (such as two) notches 38 formed in each of the legs 31 and communicating with the groove 36 of the legs 31 and located beside the projection 37 for forming or defining the projection 37.

One or more (such as two) spring members 52 each include a coil or ring 53 engaged with the projection 37 of the legs 31, and one end 54 (FIG. 3) for engaging with the legs 31 of the operating arm 30 and the other end 55 for engaging with the perforations 56 of the catch device 50 and thus for biasing or forcing the pawls 51 of the catch device 50 to engage with the disc teeth 25 of the toothed discs 23 and for allowing the toothed discs 23 and the reel drum 20 to be rotated relative to the base 10 by the operating arm 30 in the active direction, or for allowing the operating arm 30 to be rotated freely relative to the reel drum 20 in the reverse direction, but not to be rotated relative to the reel drum 20 in the active direction, and thus for allowing the belt (not shown) to be wound onto the reel drum 20 step by step.

The cargo bracing device 1 further includes a locking or anchoring or securing means or device 60 for selectively extending or engaging into the open portion 35 of the opening 34 of the legs 31, or for selectively closing or blocking the opened opening 34 of the legs 31, or for selectively and detachably anchoring or securing or retaining the legs 31 of the operating arm 30 to the reel drum 20, and for preventing the legs 31 of the operating arm 30 from being disengaged from the reel drum 20 and the base 10. For example, the anchoring means or device 60 includes one or more (such as two) anchor members 61 attached or mounted or secured to the catch device 50, such as to the pawls 51 of the catch device 50 with such as fasteners 62 respectively for selectively engaging with the reel drum 20 and thus for detachably anchoring or securing or retaining the legs 31 of the operating arm 30 to the reel drum 20. Alternatively, the anchor members 61 of the anchoring means or device 60 may also be directly attached to the operating arm 30 and/or the base 10.

Figure 6:
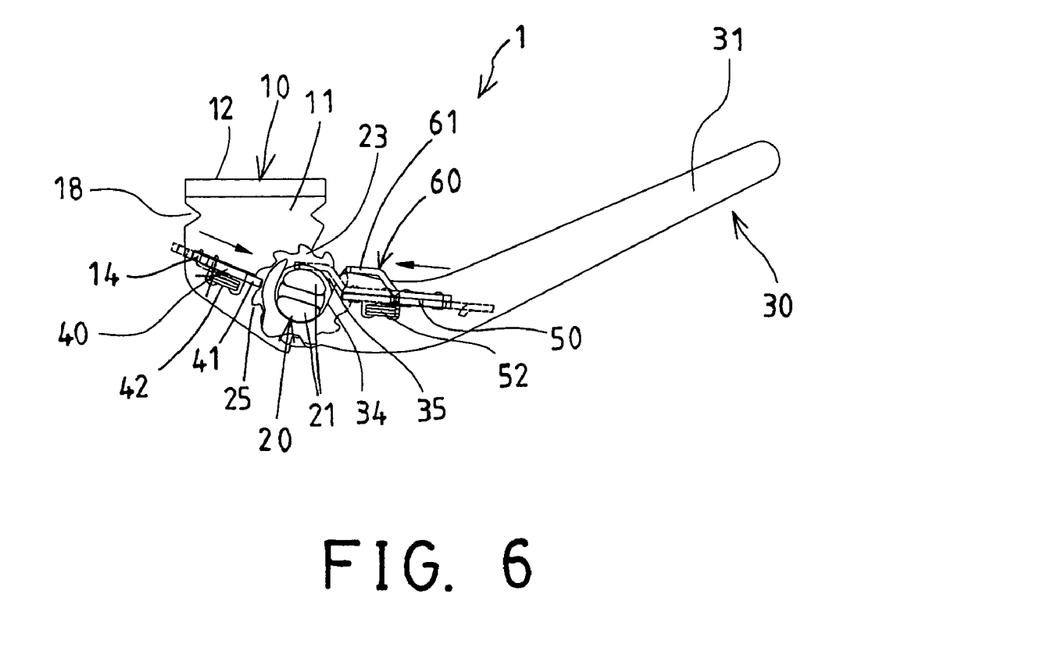
FIG. 6 is a side plan schematic view of the cargo bracing device in which a portion of the cargo bracing device has been cut off or removed for showing the inner structure of the cargo bracing device.
Figure 7:
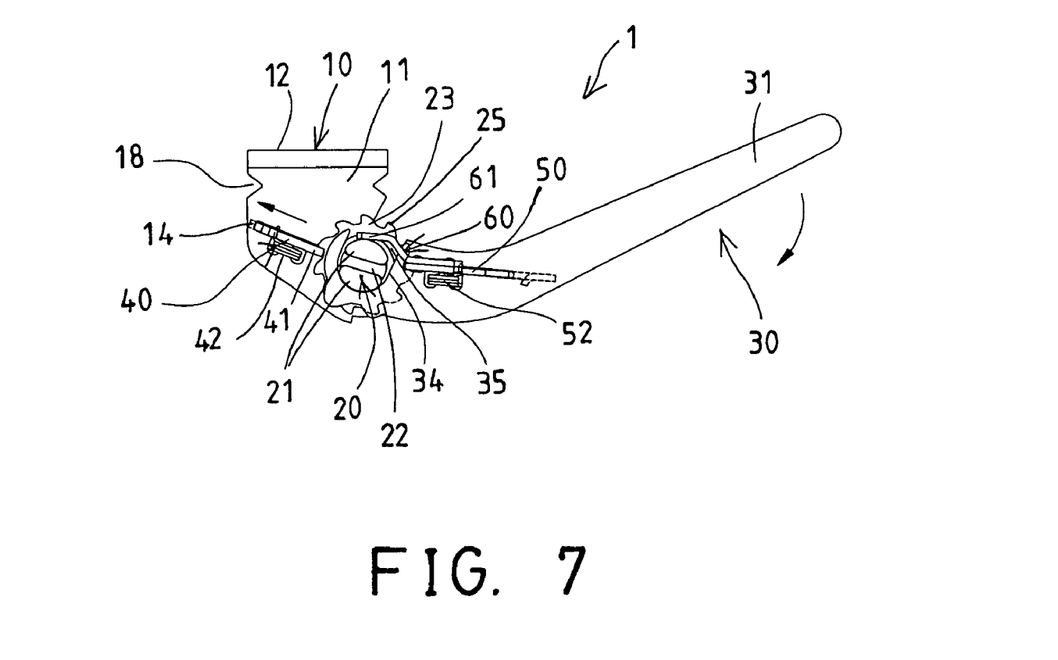
FIGS. 7, 8, 9, 10 are side plan schematic views similar to FIG. 6 illustrating the operation of the cargo bracing device.
Figure 8:
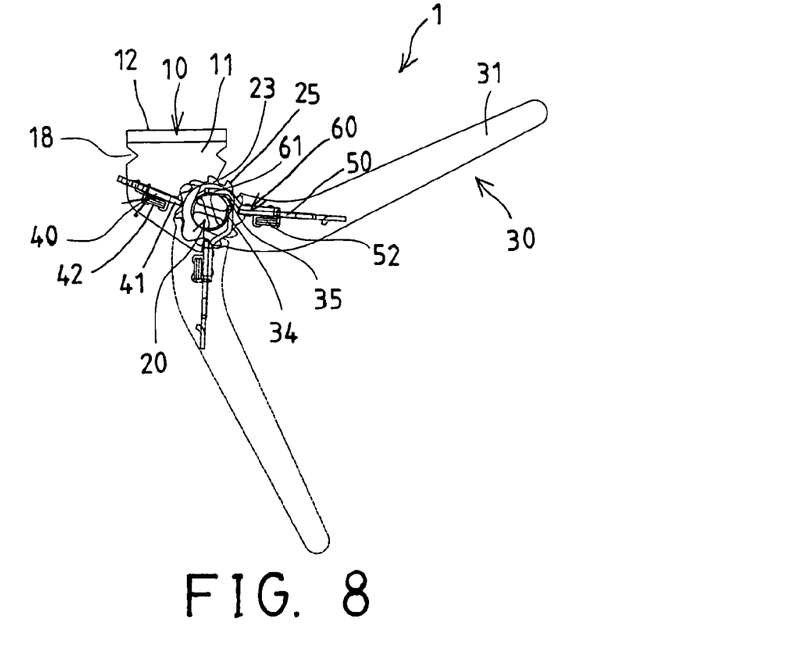

In operation, as shown in FIG. 6, the limbs 41 of the stop 40 may be biased or forced to engage with the disc teeth 25 of the toothed discs 23 by the spring members 42 for limiting and allowing the toothed discs 23 and the reel drum 20 to rotate relative to the base 10 in the active direction, i.e. clockwise relative to the base 10, and for preventing the reel drum 20 from being rotated in the reverse direction, i.e. counterclockwise relative to the base 10, or for preventing the belt and the reel drum 20 from being rotated reversely, i.e. counterclockwise relative to the base 10. At this moment, the toothed discs 23 and the reel drum 20 may be forced to rotate relative to the base 10 in the active direction, i.e. clockwise relative to the base 10, by the operating arm 30 and the catch device 50 (FIGS. 7, 8).

Figure 9:
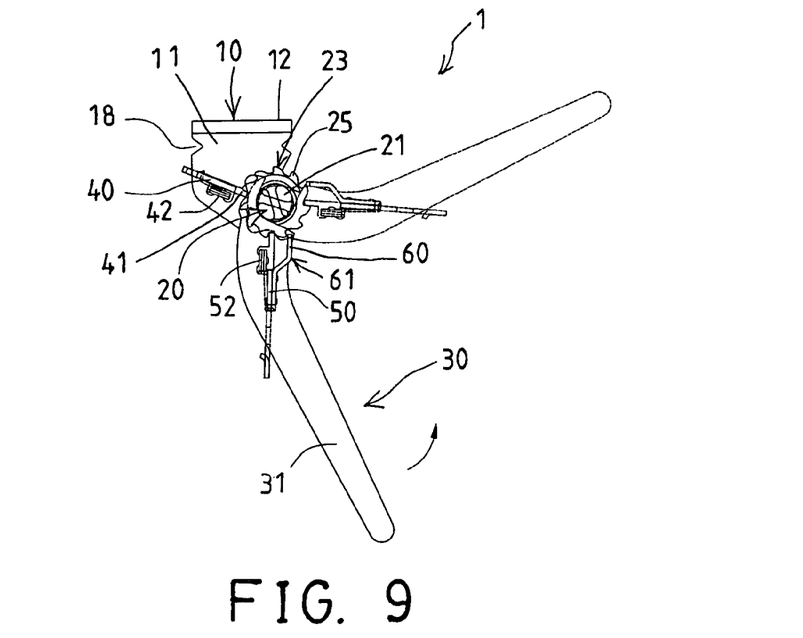
Figure 10:
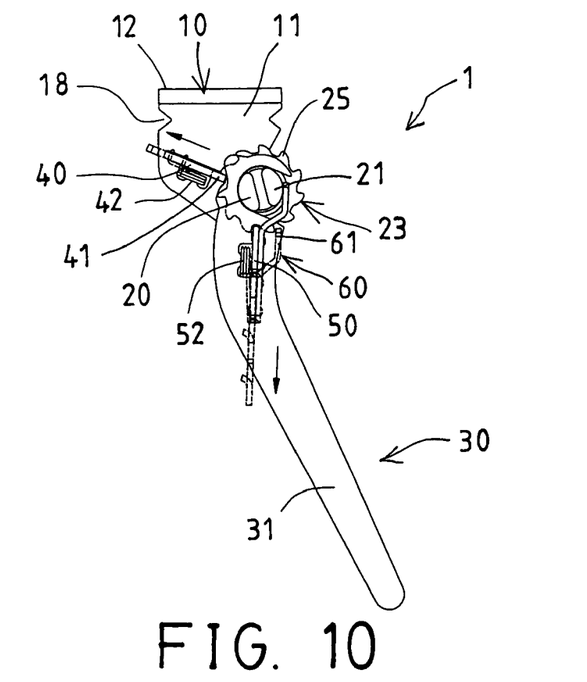

As shown in FIG. 9, the operating arm 30 may be rotated reversely, i.e. counterclockwise relative to the base 10 when the toothed discs 23 and the reel drum 20 are anchored or positioned or latched by the limbs 41 of the stop 40, and thus for allowing the toothed discs 23 and the reel drum 20 to be forced to rotate relative to the base 10 in the active direction, i.e. clockwise relative to the base 10, by the operating arm 30 and the catch device 50 step by step, in order to wind the belt onto the reel drum 20 step by step. After the belt has been tightly wound onto the reel drum 20 by the operating arm 30, or when required, as shown in FIG. 10, the catch device 50 may be moved or pulled against the spring members 52 to selectively disengage the anchor members 61 of the anchoring device 60 from the open portion 35 or the opening 34 of the legs 31 when required.

Similarly, the catch device 50 may also be pulled against the spring members 52 to selectively open the open portion 35 or the opening 34 of the legs 31, and thus to allow the legs 31 of the operating arm 30 to be selectively disengaged from the reel drum 20 and the base 10 or separated from the cargo bracing device 1, and thus to prevent the operating arm 30 of the cargo bracing device 1 from being operated or actuated by unauthorized persons. The typical cargo bracing or tie-down or fastening devices or strapping devices failed to provide an operating arm 30 having two legs 31 selectively disengageable from the reel drum 20 and the base 10 after the belt has been tightly wound onto the reel drum 20 by the operating arm 30.

Figure 1:
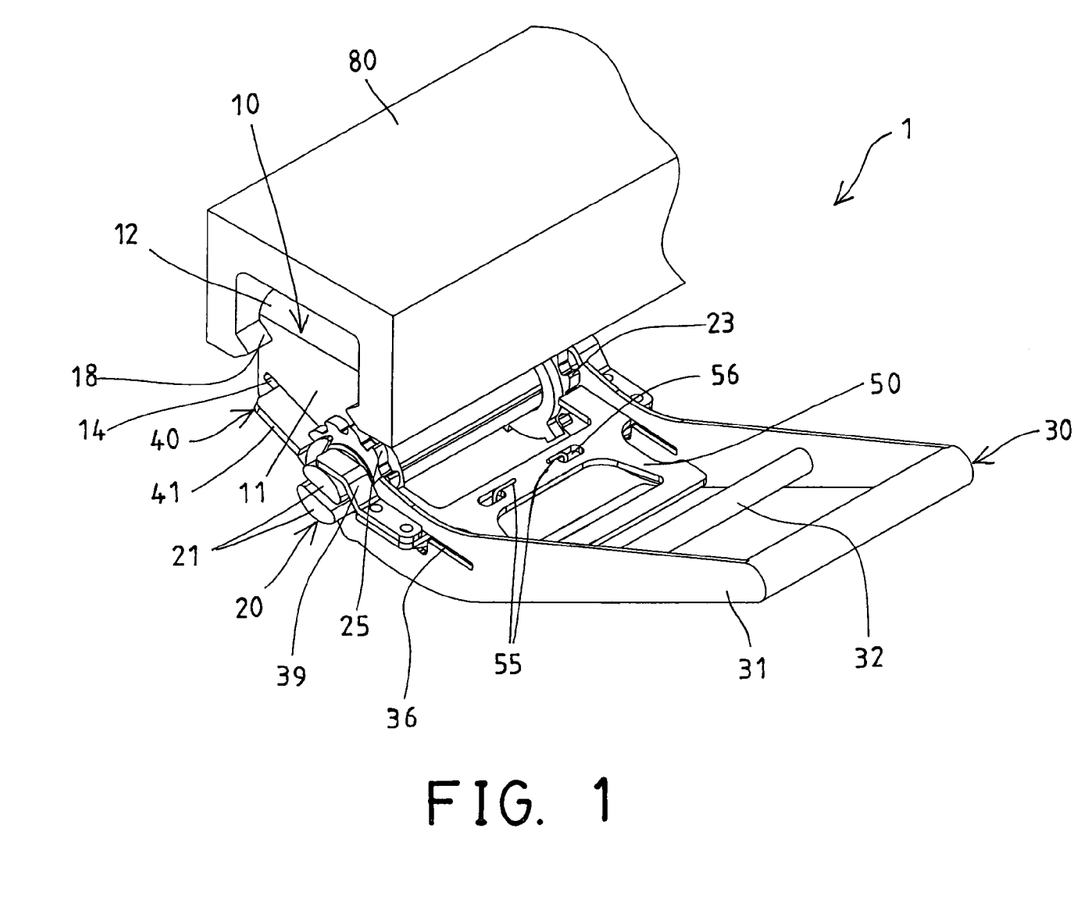
FIG. 1 is a partial perspective view illustrating an application of a cargo bracing device in accordance with the present invention.
Figure 2:
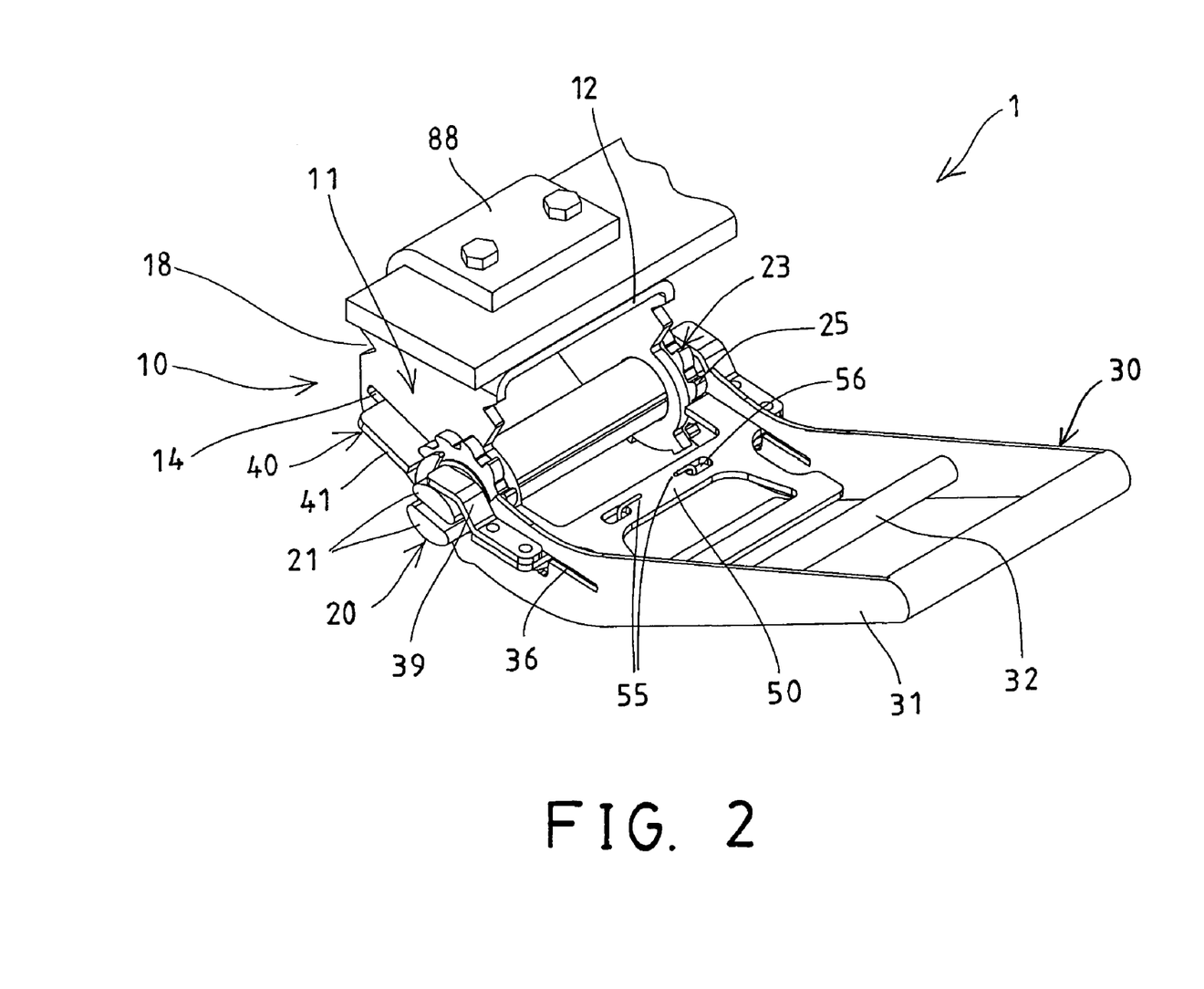
FIG. 2 is another partial perspective view similar to FIG. 1, illustrating the other application of the cargo bracing device.
Figure 11:
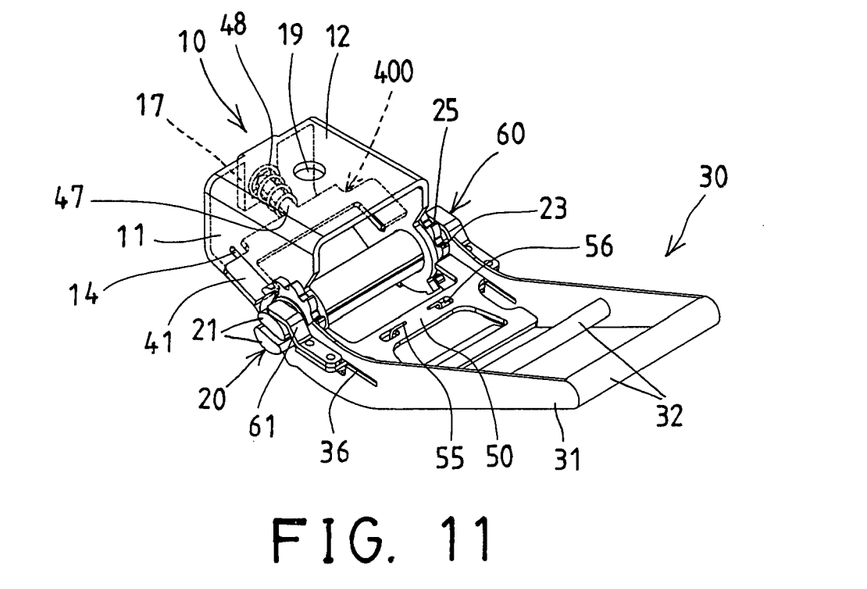
FIG. 11 is a perspective view similar to FIG. 4, illustrating the other application or arrangement of the cargo bracing device.

Alternatively, as shown in FIG. 11, the stop 400 may also include one or more (such as two) limbs 41 for engaging with the disc teeth 25 of the toothed discs 23, and may further include a finger 47 extended therefrom for engaging with a spring member 48 which is engaged between the stop 400 and a flap 17 of the base 10 for biasing or forcing the limbs 41 of the stop 400 to engage with the disc teeth 25 of the toothed discs 23. The base 10 may further include one or more holes 19 formed therein for anchoring or positioning or securing the base 10 to the various supporting objects 80 (FIG. 1), 88 (FIG. 2).

Figure 12:
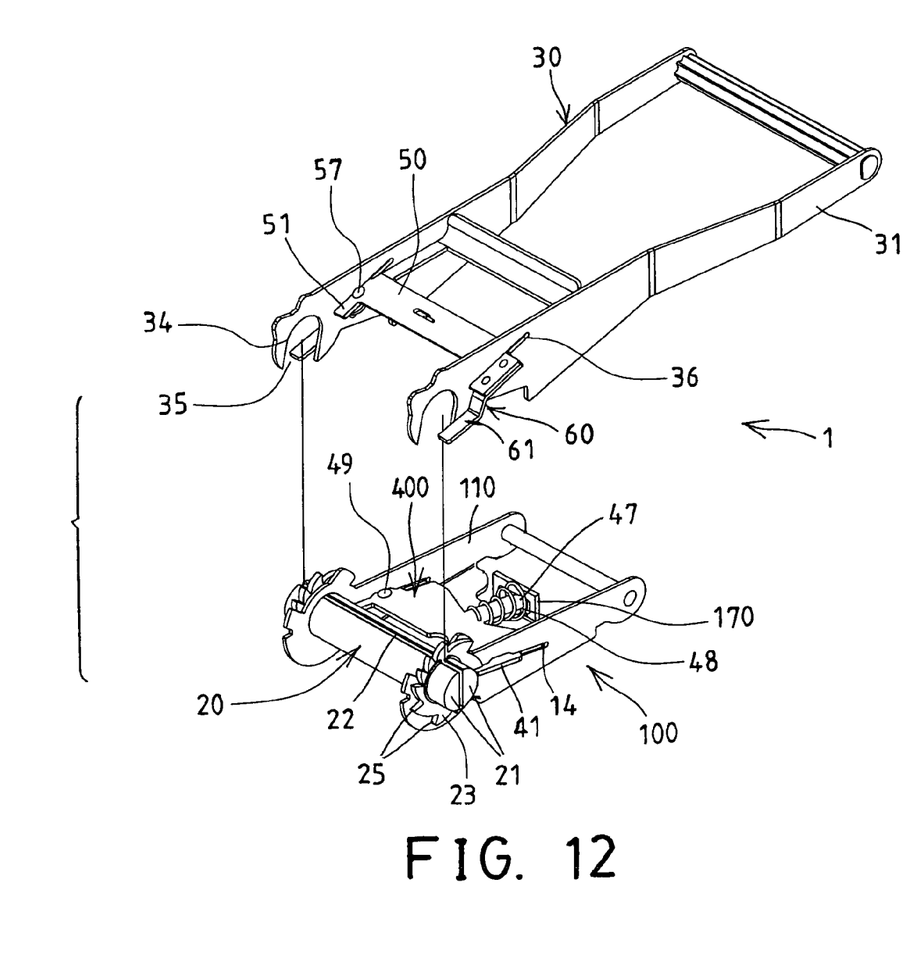
FIG. 12 is a partial exploded view illustrating the further application or arrangement of the cargo bracing device.
Figure 13:
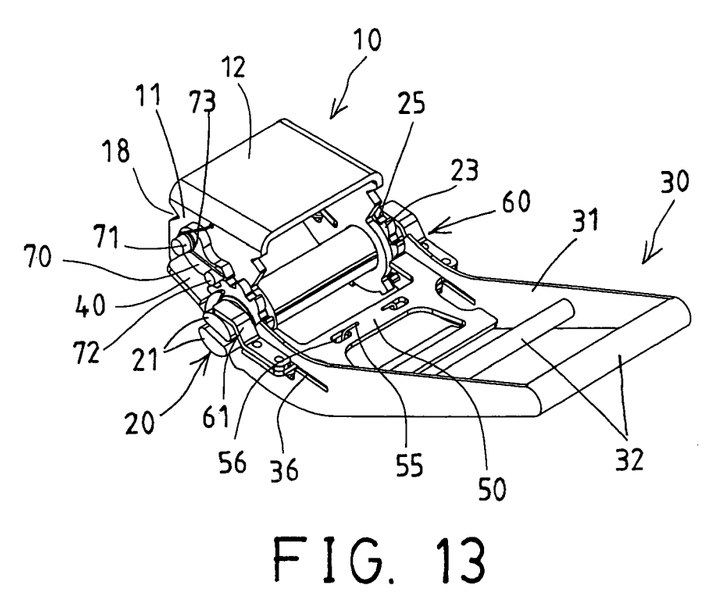
FIG. 13 is a perspective view similar to FIGS. 4, 11, illustrating the still further application or arrangement of the cargo bracing device.
Figure 14:
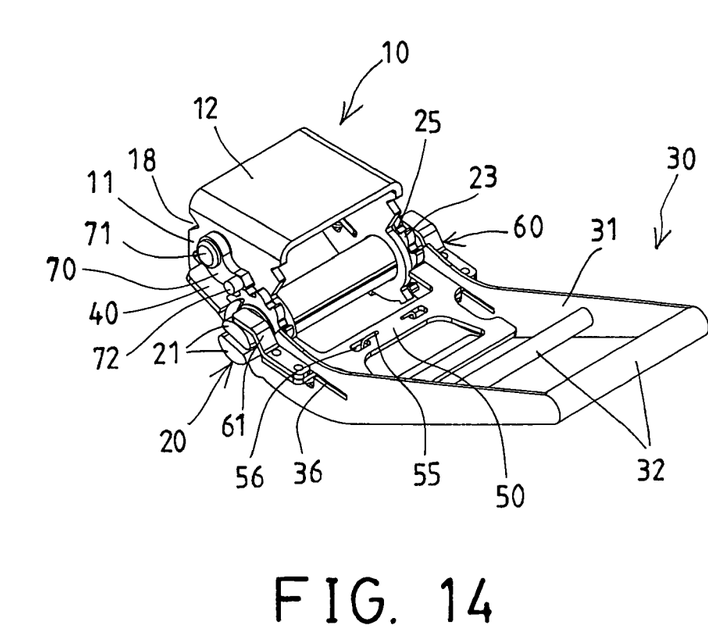
FIG. 14 is a perspective view similar to FIGS. 4, 11, 13, illustrating the still further application or arrangement of the cargo bracing device.
Figure 15:
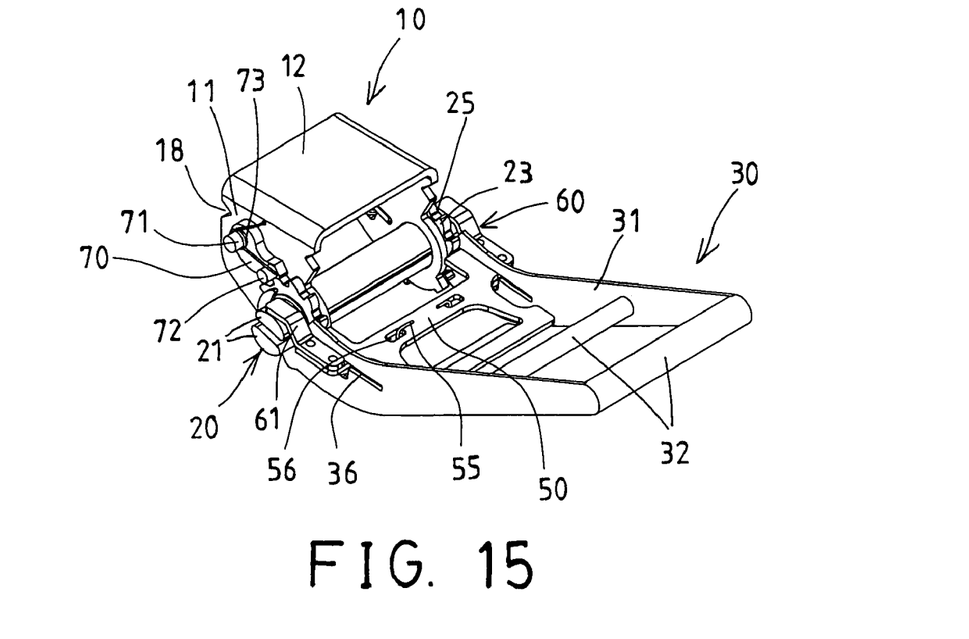
FIG. 15 is a perspective view similar to FIGS. 4, 13-14, illustrating the still further application or arrangement of the cargo bracing device.
Figure 16:
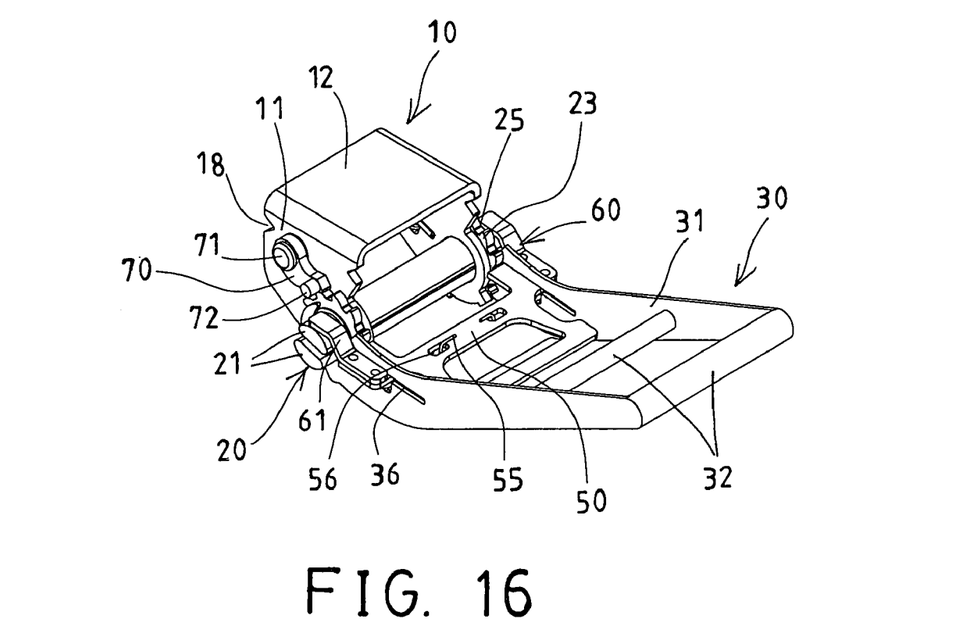
FIG. 16 is a perspective view similar to FIGS. 4, 13-15, illustrating the still further application or arrangement of the cargo bracing device.

Further alternatively, as shown in FIG. 12, the stop 400 may also be slidably attached or mounted or secured or engaged onto the base 100 which includes the other shapes, such as the arm shaped similar to the operating arm 30, and may also include a finger 47 extended therefrom for engaging with a spring member 48 which is engaged between the stop 400 and a flap 170 of the base 100 for biasing or forcing the limbs 41 of the stop 400 to engage with the disc teeth 25 of the toothed discs 23. The stop 400 may include one or more anchors 49 extended outwardly therefrom for engaging with the side plates 110 of the base 100 and for guiding the stop 400 to slide relative to the base 100. The catch device 50 may also include one or more anchor members 57 extended outwardly therefrom for engaging with the legs 31 of the operating arm 30 and for guiding the catch device 50 to slide relative to the legs 31 of the operating arm 30.

Alternatively, as shown in FIGS. 13-16, a latch 70 may further be provided and pivotally attached or coupled to the base 10 with a pivot axle 71, and includes a protrusion 72 extended outwardly therefrom for engaging with the disc teeth 25 of the toothed discs 23 and for limiting the toothed discs 23 and the reel drum 20 to rotate relative to the base 10. The latch 70 may be pivotally attached or coupled to the base 10 in addition to the stop 40 (FIGS. 13, 14), or without the stop 40 (FIGS. 15, 16), and may further include one or more spring members 73 (FIGS. 13, 15) for engaging with the latch 70 and for biasing or forcing the protrusion 72 of the latch 70 to engage with the disc teeth 25 of the toothed discs 23 and to limit the toothed discs 23 and the reel drum 20 to rotate relative to the base 10.

It is to be noted that the typical cargo bracing or tie-down or fastening devices or strapping devices failed to provide an operating arm 30 having two legs 31 selectively disengageable from the reel drum 20 and the base 10 after the belt has been tightly wound onto the reel drum 20 by the operating arm 30, for preventing the cargo bracing device 1 from being operated or actuated by the unauthorized persons and for preventing the cargo from being stolen by the unauthorized persons.

Accordingly, the cargo bracing device in accordance with the present invention includes an actuating handle selectively detached or disassembled or disengaged from the cargo bracing device for preventing the cargo bracing device from being operated or actuated by unauthorized persons.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cargo bracing device comprising:
   a base including two side plates, said side plates each including an orifice formed therein,
   a reel drum rotatably engaged in said orifices of said side plates of said base for rotatably attaching said reel drum to said base,
   at least one toothed disc attached to said reel drum and rotated in concert with said reel drum, and including a plurality of disc teeth provided thereon,
   a spring-biased stop slidably attached to said base and engaged with said disc teeth of said at least one toothed disc, for limiting said at least one toothed disc and said reel drum to rotate relative to said base in an active direction and for preventing said reel drum from being rotated in a reverse direction relative to said base,
   an operating arm including two legs rotatably attached to said reel drum,
   a spring-biased catch device slidably attached to said operating arm and engaged with said disc teeth of said at least one toothed disc, for allowing said at least one toothed disc and said reel drum to be rotated relative to said base by said operating arm in the active direction and for preventing said reel drum from being rotated in the reverse direction relative to said base by said operating arm, and
   means for detachably anchoring said legs of said operating arm to said reel drum, and said legs of said operating arm being selectively disengageable from said reel drum and said base when required, said detachably anchoring means including at least one anchor member for detachably anchoring said legs of said operating arm to said reel drum, and said at least one anchor member being attached to said catch device for selectively engaging with said reel drum.

2. The cargo bracing device as claimed in claim 1, wherein said operating arm includes an opening formed in each of said legs for receiving said reel drum and for attaching said legs of said operating arm to said reel drum, and said opening of at least one of said legs includes an open portion, and said at least one anchor member is selectively engageable into said open portion of said opening of said legs.

3. The cargo bracing device as claimed in claim 1, wherein said reel drum includes two drum halves spaced away from each other for forming a strap receiving slot between said drum halves.

4. The cargo bracing device as claimed in claim 3, wherein said at least one toothed disc include two apertures formed therein for receiving said drum halves of said reel drum respectively and for allowing said at least one toothed disc to be rotated in concert with said reel drum.

5. The cargo bracing device as claimed in claim 1, wherein said base includes a channel formed in each of said side plates for slidably attaching said stop.

6. The cargo bracing device as claimed in claim 4, wherein said base includes a peg formed in at least one of said side plates, and a spring member includes a ring engaged with said peg of said side plate, and a first end engaged with said side plate of said base and a second end for engaging with said stop and for biasing said stop to engage with said disc teeth of said at least one toothed disc.

7. The cargo bracing device as claimed in claim 6, wherein said stop includes a perforation formed therein for receiving said second end of said spring member.

8. The cargo bracing device as claimed in claim 6, wherein said base includes a notch formed in at least one of said side plates and communicating with said channel of said side plate and located beside said peg for forming said peg and for receiving said ring of said spring member.

9. The cargo bracing device as claimed in claim 1, wherein said operating arm includes a groove formed in each of said legs for slidably attaching said catch device.

10. The cargo bracing device as claimed in claim 9, wherein said operating arm includes a projection formed in at least one of said legs, and a spring member includes a ring engaged with said projection of said leg, and a first end engaged with said leg of said operating arm and a second end for engaging with said catch device and for biasing said catch device to engage with said disc teeth of said at least one toothed disc.

11. The cargo bracing device as claimed in claim 10, wherein said catch device includes a perforation formed therein for receiving said second end of said spring member.

12. The cargo bracing device as claimed in claim 10, wherein said operating arm includes a notch formed in at least one of said legs and communicating with said groove of said leg and located beside said projection for forming said projection and for receiving said ring of said spring member.

13. A cargo bracing device comprising:
   a base including two side plates, said side plates each including an orifice formed therein,
   a reel drum rotatably engaged in said orifices of said side plates of said base for rotatably attaching said reel drum to said base,
   at least one toothed disc attached to said reel drum and rotated in concert with said reel drum, and including a plurality of disc teeth provided thereon,
   a spring-biased stop slidably attached to said base and engaged with said disc teeth of said at least one toothed disc, for limiting said at least one toothed disc and said reel drum to rotate relative to said base in an active direction and for preventing said reel drum from being rotated in a reverse direction relative to said base,
   an operating arm including two legs rotatably attached to said reel drum,
   a spring-biased catch device slidably attached to said operating arm and engaged with said disc teeth of said at least one toothed disc, for allowing said at least one toothed disc and said reel drum to be rotated relative to said base by said operating arm in the active direction and for preventing said reel drum from being rotated in the reverse direction relative to said base by said operating arm, and
   means for detachably anchoring said legs of said operating arm to said reel drum, and said legs of said operating arm being selectively disengageable from said reel drum and said base when required, said detachably anchoring means including at least one anchor member for detachably anchoring said legs of said operating arm to said reel drum, and said at least one anchor member being attached to said catch device with at least one fastener.

* * * * *